United States Patent [19]

Kleeb

[11] Patent Number: 4,680,279
[45] Date of Patent: Jul. 14, 1987

[54] ABRASION RESISTANT REFRACTORY COMPOSITION

[75] Inventor: Thomas R. Kleeb, Pittsburgh, Pa.

[73] Assignee: Dresser Industries, Inc., Dallas, Tex.

[21] Appl. No.: 832,915

[22] Filed: Feb. 24, 1986

Related U.S. Application Data

[63] Continuation-in-part of Ser. No. 748,260, Jun. 24, 1985.

[51] Int. Cl.$^4$ .......................... C04B 35/18; C04B 7/32
[52] U.S. Cl. .................................... 501/124; 501/125; 106/104
[58] Field of Search ................. 501/124, 125; 106/104

[56] References Cited

U.S. PATENT DOCUMENTS

| | | | |
|---|---|---|---|
| 3,060,043 | 10/1962 | Renkey | 501/124 |
| 3,282,579 | 11/1966 | Miller | 501/125 X |
| 3,802,894 | 4/1974 | Frost et al. | 106/104 X |
| 4,102,695 | 7/1978 | Claverie | 501/124 |
| 4,111,711 | 9/1978 | Kiehl et al. | 106/104 X |
| 4,236,931 | 12/1980 | Kiehl et al. | 106/104 X |

*Primary Examiner*—William R. Dixon, Jr.
*Assistant Examiner*—Karl Group

[57] ABSTRACT

A refractory composition characterized by relatively high abrasion resistance, good flowability and long working time, comprised of 0.5 to 5 weight percent volatilized silica, 3.0 to 15 weight percent −65 mesh alumina, 20–40 weight percent cement, and the balance a refractory aggregate. Better results are obtained with a composition comprised of from 30–40 weight percent cement.

6 Claims, No Drawings

ABRASION RESISTANT REFRACTORY COMPOSITION

This is a continuation-in-part application of U.S. Ser. No. 748,260 filed 06/24/85.

BACKGROUND OF THE INVENTION

This invention relates to a refractory composition characterized by high abrasion resistance, and in particular, to such a composition which may be used as a refractory castable.

Refractory castables are hydraulic setting compositions. They comprise granular refractory aggregates and chemical binders. The refractory castables are shipped in dry form, and when mixed with water to the desired consistency, may be poured like concrete, tamped or rammed into place, troweled or applied with an air gun. Refractory castables take a strong hydraulic set at room temperatures and maintain good strength until the desired ceramic bond is developed as the temperature is increased. Castables are specially suited for furnace linings of irregular contours, for patching brick work and for casting special shapes which may be urgently required. Numerous castable compositions are known, with each of the known compositions, having different properties, making each one useful for different applications.

One such application involves the use of refractory castables in lining transfer lines employed in fluid catalytic cracking units used in petrochemical processes. In such units, highly abrasive catalysts travel at high speeds, thereby creating extreme erosion potential throughout the catalytic cracking unit. In such units, early abrasion resistant linings were formed from phosphate bonded refractories, which required extensive anchoring and hand ramming to install. To reduce the expense of installing phosphate bonded refractories, the refining industry began using castables with field additions of stainless steel fibers which required less anchoring on the metal shell, and which could be poured relatively quickly. Although the foregoing improved on the time and cost of installation, increased abrasion resistance was desired.

Abrasion resistant linings in petrochemical vessels are typically chemically bonded or cement bonded refractory compositions. Abrasion resistance is generally obtained by utilizing a strong, dense refractory grain such as calcined fireclay, and a strong bond consisting of aluminum orthophosphate, or calcium aluminate cement. In the case of cement, the abrasion resistant bond is achieved by using large amounts of cement, or a combination of fumed silica, cement in amounts less than ten percent, and a surface active agent which allows flow at low water contents. Improved density, which is achieved by casting at low water contents, results in a highly abrasion resistant bond at low cement levels.

Trying to effect further economies in installation, operators of the fluid catalytic cracking units started casting larger sections of transfer lines, eliminating the assembly of many smaller sections. The refractory castables used on the transfer lines were made with relatively fast setting cements, and did not stay flowable a sufficient time for use in such applications. Refractory manufacturers reformulated their abrasion resistant castables to incorporate casting grade cements to lengthen working time. These products provided the flowability and working time needed, but strengths and abrasion resistance were often lower than similar mixes containing regular calcium aluminate cement.

SUMMARY OF THE INVENTION

Accordingly, it is an object of this invention to provide a refractory composition characterized by good flowability and relatively long working times, with improved densities, strength and abrasion resistance. The foregoing objective is achieved in a refractory composition comprised of 0.5–5%, by weight, volatilized silica; 3.0–15.0%, by weight, −65 mesh alumina; 20–40%, by weight, calcium aluminate cement; and the balance a refractory aggregate selected from the class consisting of silica, alumina, or fireclay. Better results are obtained with a refractory composition wherein the range of calcium aluminate cement is from 30–40%.

DESCRIPTION OF THE PREFERRED EMBODIMENT

The utilization of refractory castable compositions in highly abrasive environments, requires the castables to have excellent abrasion resistant properties. In addition, when used to line relatively large members, such as lining of transfer lines used in fluid catalytic cracking units, the castable should have good flowability and relatively long working times, so that the castable can be installed.

A first series of mixes was prepared (see Table I below). In describing the various mixes, all percentages will be on a weight percent basis unless otherwise indicated. This mix series shows the effects of increasing the fine alumina content from 0–15% in a fireclay castable. As may be observed, density, strength and abrasion resistance improve as the alumina content increases. Abrasion resistance improvement from 8.4 cc loss in the mix having 0% alumina to 7.0 cc loss in the mix having 15% alumina, is significant for a type of refractory which has relatively good abrasion resistance before the alumina addition. Fine, synthetic aluminas are commonly used in the refractory industry to improve the refractoriness of the bonding portion of the refractory, and as a source of fine material to insure that the refractory has a proper grain size distribution.

TABLE I

Mixes Containing A-17 Reactive Alumina Without Volatilized Silica

| Mix Designation: | B | C | D | E |
|---|---|---|---|---|
| Mix: | | | | |
| Calcined Super Duty Flint, −3 mesh | 50% | 50% | 50% | 50% |
| Calcined Super Duty Flint, BMF | 20 | 17 | 11 | 5 |
| A-17 Reactive Alumina, −325 mesh | 0 | 3 | 9 | 15 |
| CA-25 C Casting Grade Cement | 30 | 30 | 30 | 30 |
| Casting Water Required, %: | 8.7 | 8.6 | 8.4 | 8.2 |
| Bulk Density, pcf | | | | |
| After Drying at 250° F.: | 144 | 145 | 150 | 152 |
| After Heating 5 Hrs. at 1500° F.: | 137 | 139 | 141 | 145 |
| Cold Crushing Strength After Heating 5 Hrs. at 1500° F., psi: | 14,260 | 15,940 | 16,880 | 16,900 |
| Abrasion Test (ASTM C-704) Volume Loss of Samples Heated 5 Hrs. at 1500° F., cu cm: | 8.4 | 7.2 | 7.1 | 7.0 |

A second series of mixes were made to determine the effect of adding 0–5% volatilized silica to the same abrasion resistant fireclay castable. Volatilized silica additions of 0.5% and 2% resulted in improved densities, strength and abrasion resistance. At volatilized silica levels of 3% and 5%, the mix became sticky and did not flow as well as previously. Densities and strength suffered, but the improved abrasion resistance is maintained. Volatilized silica is a sub-micron, amorphous bi-product of ferrosilicon production and is a well known refractory raw material. It is used primarily as a source of ultrafine particles, as a source of reactive silica and as an additive to improve flow properties. As Table II illustrates, only small amounts can be used in cement containing mixes or flow properties would be adversely affected.

is employed as a refractory castable for use in relatively large applications. The synergistic effect of using volatilized silica and fine alumina together should be noted. The abrasion resistances of mixes N and P are superior to any of the mixes set forth in Tables I and II, where each material was used separately.

TABLE III

| Evaluation of Alumina/Silica Ratio when Fine Alumina + Volatilized Silica Equals 10% | | | | |
|---|---|---|---|---|
| Mix Designation: | K | L | N | P |
| Mix: | | | | |
| Calcined Super Duty Flint, −3 mesh | 50% | 50% | 50% | 50% |
| Calcined Super Duty Flint, BMF | 10 | 10 | 10 | 10 |
| A-17 Reactive Alumina, −325 mesh | 10 | 9 | 8 | 7 |
| Volatilized Silica | — | 1 | 2 | 3 |
| CA-25 C Casting Grade Cement | 30 | 30 | 30 | 30 |
| Casting Water Required, %: | 9.4 | 8.15 | 8.0 | 8.65 |
| Casting Characteristics: | All mixes flowed well during vibration casting. At a volatilized silica level of 3%, the mix was sticky and difficult to handle. | | | |
| Bulk Density, pcf | | | | |
| After Drying at 250° F.: | 141 | 148 | 151 | 141 |
| After Heating 5 Hrs. at 1500° F.: | 135 | 140 | 141 | 136 |
| Cold Crushing Strength After Heating 5 Hrs. at 1500° F., psi: | 6,990 | 12,460 | 12,440 | 9,660 |
| Abrasion Test (ASTM C-704) Volume Loss of Samples Heated 5 Hrs. at 1500° F., cu cm: | 10.1 | 6.7 | 5.7 | 4.6 |

A fourth series of mixes were made, with each of the mixes being compounded according to the teachings of the present invention. Each of the mixes contained 2% volatilized silica and 8% fine alumina of three different types. All four mixes had high cold crushing strengths and outstanding abrasion resistance. The A-17 and A-15 reactive aluminas are almost entirely composed of fine, sintered corundum (alpha-alumina) crystals. Their high surface area and small crystal size makes them thermally reactive, that is, they will further sinter or react

TABLE II

| Mixes Containing Volatilized Silica Without Fine Alumina | | | | | |
|---|---|---|---|---|---|
| Mix Designation: | B | F | G | H | J |
| Mix: | | | | | |
| Calcined Super Duty Flint, −3 mesh | 50% | 50% | 50% | 50% | 50% |
| Calcined Super Duty Flint, BMF | 20 | 19.5 | 18 | 17 | 15 |
| Volatilized Silica | — | 0.5 | 2 | 3 | 5 |
| CA-25 C Casting Grade Cement | 30 | 30 | 30 | 30 | 30 |
| Casting Water Required, %: | 8.7 | 8.0 | 7.9 | 7.8 | 7.6 |
| Casting Characteristics: | At volatilized silica levels up to 2%, the mix flowed well during vibration casting. At a 3% volatilized silica level, the mix flowed well, but was sticky. At a 5% volatilized silica level, the mix had poor flow during casting, was very sticky to the point that handling was difficult, and dried out quickly, making large installations difficult. | | | | |
| Bulk Density, pcf | | | | | |
| After Drying at 250° F.: | 144 | 147 | 147 | 147 | 145 |
| After Heating 5 Hrs. at 1500° F.: | 137 | 140 | 140 | 138 | 138 |
| Cold Crushing Strength After Heating 5 Hrs. at 1500° F., psi: | 14,260 | 16,800 | 16,290 | 12,730 | 11,420 |
| Abrasion Test (ASTM C-704) Volume Loss of Samples Heated 5 Hrs. at 1500° F., cu cm: | 8.4 | 6.8 | 6.4 | 6.1 | 6.3 |

A third series of mixes were made to determine the effects of adding volatilized silica to a fireclay castable containing fine alumina. As the alumina is replaced by up to 2% silica, density, strength and abrasion resistance improve. At a silica level of 3%, the mix becomes sticky and flow is impaired. The abrasion resistance, however, continues to improve. Mix P has outstanding abrasion resistance, but mix N is preferred because of its superior flowability, a necessary property when the composition with other compounds at relatively low temperatures. T-61 tabular alumina is also essentially 100% corundum crystals, but this material has been fired to a high temperature, resulting in coarse, tablet-shaped, non-reactive crystals. A-2 calcined alumina is about 90% corundum crystals and 10% beta-alumina ($Na_2O \cdot 11Al_2O_3$) crystals. The thermal reactivity of the A-2 calcined alumina is between tabular alumina and reactive alumina. Table VIII lists the various properties of these aluminas.

TABLE IV

Alumina Type Evaluation

| Mix Designation: | N | Q | R | S |
|---|---|---|---|---|
| Mix: | | | | |
| Calcined Super Duty Flint, −3 mesh | 50% | 50% | 50% | 50% |
| Calcined Super Duty Flint, BMF | 10 | 10 | 10 | 10 |
| A-17 Reactive Alumina, −325 mesh | 8 | — | — | — |
| A-15 Reactive Alumina, −325 mesh | — | 8 | — | — |
| T-61 Tabular Alumina, −325 mesh | — | — | 8 | — |
| A-2 Calcined Alumina, −325 mesh | — | — | — | 8 |
| Volatilized Silica | 2 | 2 | 2 | 2 |
| CA-25 C Casting Grade Cement | 30 | 30 | 30 | 30 |
| Casting Water Required, %: | 8.0 | 7.9 | 8.0 | 8.3 |
| Bulk Density, pcf | | | | |
| After Drying at 250° F.: | 151 | 149 | 150 | 149 |
| After Heating 5 Hrs. at 1500° F.: | 141 | 142 | 142 | 142 |
| Cold Crushing Strength After Heating 5 Hrs. at 1500° F., psi: | 12,440 | 11,320 | 14,410 | 15,960 |
| Abrasion Test (ASTM C-704) Volume Loss of Samples Heated 5 Hrs. at 1500° F., cu cm: | 5.7 | 5.3 | 5.6 | 5.4 |

Three further mixes were made according to the invention with 1% volatilized silica and 9% fine alumina. Mix T was based on a calcined fireclay grain. This type of mix would be used where good abrasion resistance is necessary. Mix U is based on a vitreous silica grain. This mix would be used where a combination of good abrasion resistance and low thermal conductivity are desired. Mix V is based on coarse, tabular alumina, and represents the ultimate strength and abrasion resistance. Since tabular alumina is over ten times more expensive than calcined fireclay, the increased cost may not be justified by the modest property improvements. The three mixes are intended to illustrate the types of base grains which may be used from 100% silica to a fire clay of roughly 50% silica and 45% alumina to 100% alumina. There are a variety of high alumina grains having alumina contents between fireclay and tabular alumina, such as calcined bauxitic kaolin, calcined bauxite, kyanite and andalusite, which would also work satisfactorily in this invention. In addition, non-aluminosilicates such as silicon carbide, silicon nitrides or any acid aggregate would be satisfactory.

TABLE V

Base Grain Evaluation

| Mix Designation: | T | U | V |
|---|---|---|---|
| Mix: | | | |
| Calcined Super Duty Flint, −3 mesh through fines | 60% | — | — |
| Vitreous Silica, −3 mesh through fines | — | 60% | — |
| Tabular Alumina, −6 mesh through fines | — | — | 60% |
| Calcined Super Duty Flint, BMF | | | |
| A-17 Reactive Alumina | 9 | 9 | 9 |
| Volatilized Silica | 1 | 1 | 1 |
| CA-25 C Casting Grade Cement | 30 | 30 | 30 |
| Casting Water Required, %: | 8.15 | 7.9 | 8.2 |
| Bulk Density, pcf | | | |
| After Drying at 250° F.: | 148 | 130 | 176 |
| After Heating 5 Hrs. at 1500° F.: | 140 | 123 | 166 |
| Cold Crushing Strength After Heating 5 Hrs. at 1500° F., psi: | 12,460 | 6,890 | 16,770 |
| Abrasion Test (ASTM C-704) Volume Loss of Samples Heated 5 Hrs. at 1500° F., cu cm: | 6.7 | 12.6 | 6.5 |

The next series of mixes was intended to show the effects of variations of the cement content. As may be observed, as cement content increases from 10 to 40%, cold crushing strength and abrasion resistance generally improved.

TABLE VI

| Mix Designation: | W | A | B | C | X | D | Y |
|---|---|---|---|---|---|---|---|
| Mix: | | | | | | | |
| Calcined Super Duty Flint Clay, −3 mesh | 70% | 65% | 60% | 55% | 50% | 50% | 50% |
| Calcined Super Duty Flint Clay, BMF | 10% | 10% | 10% | 10% | 10% | 5% | — |
| A-17 Reactive Alumina | 8 | 8 | 8 | 8 | 8 | 8 | 8 |
| Volatilized Silica | 2 | 2 | 2 | 2 | 2 | 2 | 2 |
| CA-25C Casting Grade Cement | 10 | 15 | 20 | 25 | 30 | 35 | 40 |
| Casting Water Required, %: | 8.0 | 8.0 | 7.9 | 8.2 | 8.0 | 9.2 | 9.0 |
| Bulk Density, pcf | | | | | | | |
| After Drying at 250° F.: | 138 | 141 | 145 | 147 | 151 | 150 | 151 |
| After Heating 5 Hours at 1500° F.: | 136 | 138 | 140 | 140 | 141 | 139 | 141 |
| Cold Crushing Strength After Heating 5 Hours at 1500° F., psi: | 5,600 | 9,610 | 11,950 | 12,410 | 12,440 | 13,050 | 12,420 |
| Abrasion Resistance: (ASTM C-704) Volume Loss of Samples Heated 5 Hours at 1500° F., cu cm: | 14.9 | 9.5 | 7.3 | 6.8 | 5.7 | 5.3 | 5.5 |

The last series of mixes establishes the upper and lower lower limits of volatilized silica and fine alumina contents as well as illustrates the preferred mix which was chosen for its good combination of flow properties and physical properties.

TABLE VII

Fine Alumina and Volatilized Silica Ranges With Preferred Mix

| | Mix Designation: | | |
|---|---|---|---|
| | Z | X | AA |
| Mix: | | | |
| Calcined Super Duty Flint Clay, −3 mesh | 50% | 50% | 50% |
| Calcined Super Duty Flint Clay, BMF | 4.5 | 10 | 12 |
| A-17 Reactive Alumina, | 15 | 8 | 3 |

TABLE VII-continued

Fine Alumina and Volatilized Silica Ranges With Preferred Mix

| | Mix Designation: | | |
|---|---|---|---|
| | Z | X | AA |
| −325 mesh Volatilized Silica | 0.5 | 2 | 5 |
| CA-25C Casting Grade Cement | 30 | 30 | 30 |
| Casting Water Required, %: | 8.4 | 8.0 | 7.6 |

Casting Characteristics: The mix containing 0.5% volatilized silica had acceptable flow properties during casting, but not as good as the mix containing 2% volatilized silica. The mix containing 5% volatilized silica had poor flow, was difficult to handle because of its stickiness and dried out quickly during casting.

| Bulk Density, pcf | | | |
|---|---|---|---|
| After Drying at 250° F.: | 154 | 151 | 149 |
| After Heating 5 Hrs at 1500° F.: | 145 | 141 | 141 |
| Cold Crushing Strength After Heating 5 Hrs at 1500° F., psi: | 15,050 | 12,440 | 11,540 |
| Abrasion Resistance (ASTM C-704) Volume Loss of Samples Heated 5 Hrs at 1500° F., cu cm: | 6.5 | 5.7 | 4.9 |

TABLE VIII

| Alumina Brand: | A-17 | A-15 | T-61 | A-2 |
|---|---|---|---|---|
| Manufacturer: | | ALCOA | | |
| Alumina Type: | Reactive | Reactive | Tabular | Calcined |
| Chemical Analysis (Typical) | | | | |
| Alumina (Al$_2$O$_3$) | 99.5+% | 99.5+% | 99.5+% | 99.2% |
| Silica (SiO$_2$) | 0.02 | 0.02 | 0.06 | 0.02 |
| Iron Oxide (Fe$_2$O$_3$) | 0.02 | 0.02 | 0.06 | 0.04 |
| Soda (Na$_2$O) | 0.07 | 0.07 | 0.10 | 0.45 |
| Ultimate Crystal Size, microns: | 3–3.5 | 2–2.5 | 10+ | 3–5 |
| Mineralogical Composition | | | | |
| Corundum, % | 100 | 100 | 100 | 90 |
| Beta Alumina, % | — | — | — | 10 |
| Particle Size Distribution | | | | |
| % Finer than 60 microns: | 100% | 100% | 100% | 100% |
| % Finer than 40 microns: | 100 | 100 | 99 | 100 |
| % Finer than 20 microns: | 100 | 100 | 80 | 94 |
| % Finer than 10 microns: | 98 | 98 | 56 | 86 |
| % Finer than 5 microns: | 87 | 90 | 37 | 74 |
| % Finer than 1 micron: | 21 | 24 | 9 | 9 |
| % Finer than 0.5 microns: | 12 | 15 | 2 | 4 |

The composition of the present invention provides a refractory castable which may be used in applications requiring high abrasion resistance, good flowability and long working times. Such properties are required in lining transfer lines of fluid catalytic cracking units.

In the present specification, all percents have been provided on a weight percent basis, and all mesh sizes have been determined in acordance with Taylor Standard Series.

While only calcined clay has been used in forming the refractory aggregate for each of the mixes, other refractory aggregates such as silica, and alumina as well as other acid aggregates, can also be used.

While a preferred embodiment of the present invention has been described and illustrated, the invention should not be limited thereto but may be otherwise embodied within the scope of the following claims.

The embodiments of the invention in which an exclusive property or privilege is claimed are defined as follows:

1. A refractory composition consisting essentially of 0.5 to 5 weight percent volatilized silica; 3.0 to 15 weight percent −65 mesh alumina; 20 to 40 weight percent calcium aluminate cement; and the balance a refractory consisting essentially of a fire clay aggregate.

2. The composition of claim 1 wherein calcium aluminate cement is present in from 30 to 40 weight percent.

3. The composition of claims 1 or 2 including water for using the composition as a refractory castable.

4. The composition in accordance with claim 2 wherein the refractory aggregate includes 4. 5 to 12 weight percent −65 mesh calcined clay.

5. The composition in accordance with claim 4 wherein the −65 mesh alumina comprises substantially 8 weight percent.

6. The composition in accordance with claim 5 wherein the volatilized silica comprises substantially 2 weight percent.

* * * * *